United States Patent
Jayaraman (10) Patent No.: US 8,396,899 B2
(45) Date of Patent: Mar. 12, 2013

(54) EFFICIENT SEGMENT DETECTION FOR DEDUPLICATION

(75) Inventor: Vinod Jayaraman, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 12/624,280

(22) Filed: Nov. 23, 2009

(65) Prior Publication Data

US 2011/0125719 A1   May 26, 2011

(51) Int. Cl.
*G06F 17/00* (2006.01)
(52) U.S. Cl. ........ 707/802; 707/791; 707/796; 707/822; 707/728
(58) Field of Classification Search .................. 707/791, 707/796, 728, 802, 822
See application file for complete search history.

(56) References Cited

U.S. PATENT DOCUMENTS

2010/0064166 A1 *  3/2010  Dubnicki et al. ................. 714/4

OTHER PUBLICATIONS

Xia, Wen et al., "SiLo: A Similarity-Locality based Near-Exact Deduplication Scheme with Low RAM Overhead and High Throughput", [Online]. Retrieved from the Internet: <http://static.usenix.org/events/atc11/tech/final_files/Xia.pdf/,(Accessed on May 23, 2012),14 pgs.

Guo, Fanglu et al., "Building a High-performance Deduplication System", *Symantec Corporation*, Culver City, CA, [Online]. Retrieved from the Internet: <http://static.usenix.org/event/atc11/tech/final_files/GuoEfstathopoulos.pdf>,(Accessed on May 23, 2012),14 pgs.

* cited by examiner

*Primary Examiner* — Sana Al Hashemi
(74) *Attorney, Agent, or Firm* — Kwan & Olynick LLP (57) ABSTRACT

Mechanisms are provided for efficiently detecting segments for deduplication. Data is analyzed to determine file types and file components. File types such as images may have optimal data segment boundaries set at the file boundaries. Other file types such as container files are delayered to extract objects to set optimal data segment boundaries based on file type or based on the boundaries of the individual objects. Storage of unnecessary information is minimized in a deduplication dictionary while allowing for effective deduplication.

20 Claims, 8 Drawing Sheets

| Data A | Data B | Data C | File X 101 |
| Data D | Data B | Data C | File Y 103 |
| Data D | Data B | Data E | File Z 105 |

| Filemap File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| | Data Table 251 | |
| Index 253 | Data Offset 255 | Data Reference Count 257 |
| 1 | Offset-Data A | 1 |
| 2 | Offset-Data B | 1 |
| 3 | Offset-Data C | 1 |
| | Datastore | |
| | Data 261 | Last File 263 |
| 1 | Data A | File X 201 |
| 2 | Data B | File X 201 |
| 3 | Data C | File X 201 |

Figure 3

| Dictionary 301 ||
| Hash | Storage Location 321 |
| a | Location 323 |
| b | Location 325 |
| c | Location 327 |

| Dictionary 351 ||
| Hash | Storage Location 371 |
| i | Location 373 |
| j | Location 375 |
| k | Location 377 |

EFFICIENT SEGMENT DETECTION FOR DEDUPLICATION

TECHNICAL FIELD

The present disclosure relates to efficient segment detection for deduplication. More specifically, the present disclosure relates to determining efficient segment boundaries for a variety of files and file types.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or the actual data. Once the segment ID is generated, it can be used to determine if the data segment already exists in the system. If the data segment does exist, it need not be stored again. The reference count for the single instance data segment is incremented and some form of file mapping construct is used to associate the deduplicated segment from a particular file to the single instance stored in the storage system.

However, mechanisms for performing efficient segment detection in a system for deduplication are limited. Consequently, mechanisms are provided for improving the ability to detect and determine efficient segment boundaries and sizes.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular file types. However, it should be noted that the techniques and mechanisms of the present invention apply to a variety of different file types. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for efficiently detecting segments for deduplication. Data is analyzed to determine file types and file components. File types such as images may have optimal data segment boundaries set at the file boundaries. Other file types such as container files are delayered to extract objects to set optimal data segment boundaries based on file type or based on the boundaries of the individual objects. Storage of unnecessary information is minimized in a deduplication dictionary while allowing for effective deduplication.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient.

Other mechanisms include data deduplication. In a file server system, deduplication is hidden from users and applications. Data deduplication reduces storage footprints by reducing the amount of redundant data.

According to various embodiments, an optimization tool can aggressively compress and deduplicate files based on characteristics of particular files and file types as well as based on characteristics across multiple files. According to various embodiments, any processed file that may be smaller, more efficiently read and transmitted, and/or more effectively stored than a non-processed file is referred to herein as an optimized file. Any individual file or portion of the individual file that is processed to increase the storage efficiency of the file is referred to herein as a compressed file. Any file associated with a group of files that are processed to increase the storage efficiency of the group of files is referred to herein as a deduplicated file. That is, instead of simply optimizing a single file, multiple files can be optimized efficiently. It should be noted that a deduplicated file is not necessarily compressed and a compressed filed is not necessarily deduplicated, but an optimized file can be compressed and/or deduplicated.

Optimization may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, deduplication searches for matching sequences using a fixed or sliding window and uses references to matching sequences instead of storing the matching sequences again.

According to various embodiments, it can be extremely difficult to determine optimal or even effective segment boundaries. In particular embodiments, if segment sizes are too small, dictionaries used to maintain identifiers, hashes, or references for each segment become unnecessarily large. If segment sizes are too large, deduplicates become rare and data is insufficiently optimized. Consequently, the techniques and mechanisms of the present invention recognize that determining efficient segment boundaries depends on the underlying data and file types. Mechanisms are provided to increase the storage efficiency of the dictionary. In particular embodiments, storage efficiency can be increased by finding the optimal boundary for data segments such that any smaller segment would be very unlikely to produce additional dupes.

According to various embodiments, file types are analyzed. Particular files such as images may be optimal data segment sizes equivalent to the size of the image file itself. Having a segment size for an image equal the file size of the image allows the storage of only a single entry in the dictionary for the entire file. In many instances, container files such as ZIP or Word files include a variety of objects including images.

According to various embodiments, container files are delayered to extract objects from containers files. Individual objects are stored and deduplicated as individual objects. In particular embodiments, efficient segment boundaries may be object boundaries within a container file. Various mechanisms prevent storing unnecessary information in the dictionary. For file types that would benefit from segment sizes smaller than the file itself, segment sizes may be adjusted dynamically or set using predetermined values for particular file types or file contents. Sliding windows may also be applied.

Figure 1:
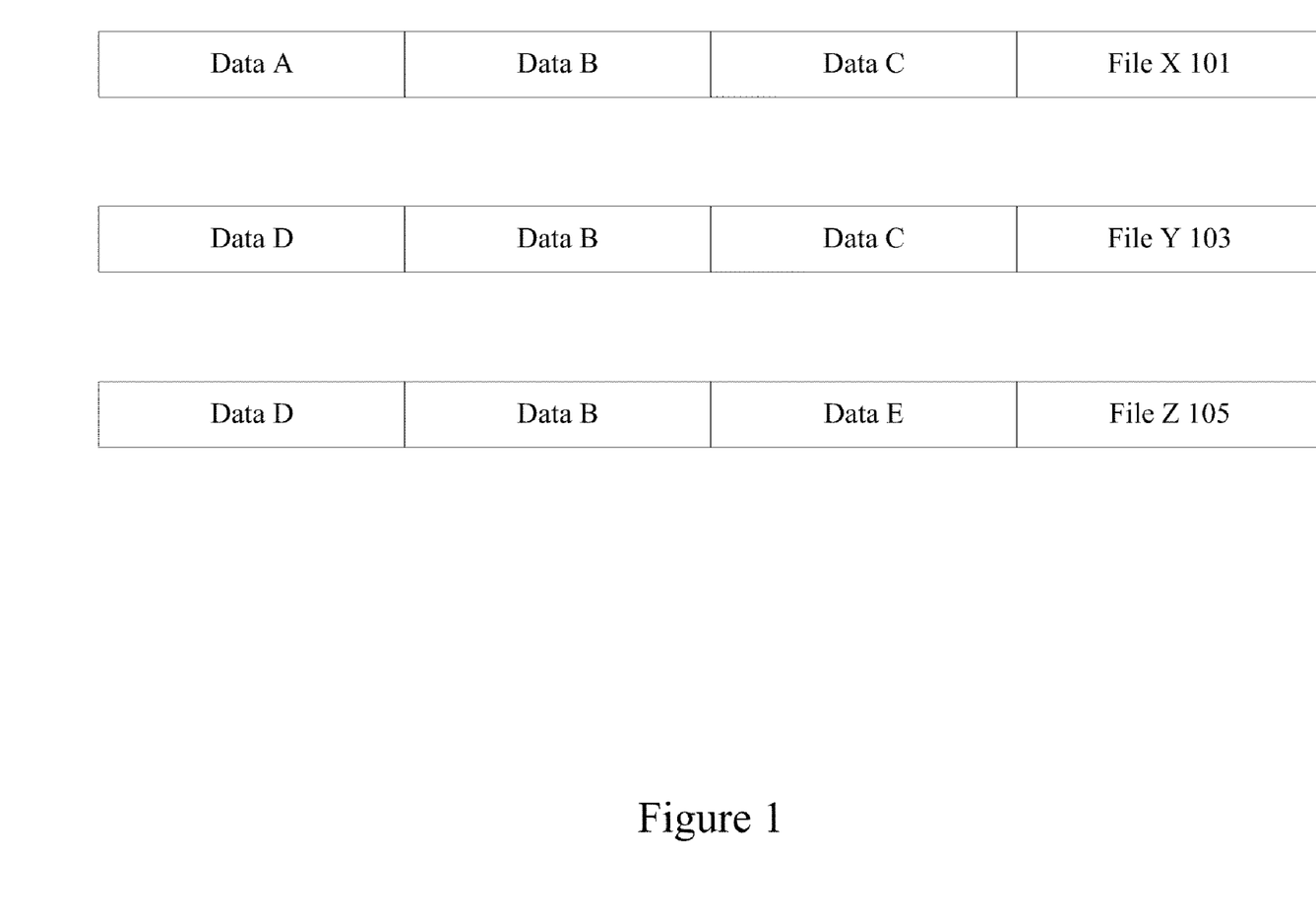
FIG. 1 illustrates a particular example of files and data segments.

FIG. 1 illustrates examples of files and data segments. According to various embodiments, file X 101 includes data A, data B, and data C. File Y 103 includes data D, data B, and data C. File Z 105 includes data D, data B, and data E. According to various embodiments, each data segment is 8K in size. The three files include five different segments A, B, C, D, and E. Files X 101, Y 103, and Z 105 can be deduplicated to remove redundancy in storing the different segments. For example, data B need only be stored once instead of three times. Data C and data D need only be stored once instead of twice. However, the techniques and mechanisms of the present invention recognize that segment detection can be difficult. Very limited mechanisms are available for identifying appropriate start segment locations and end segment locations to increase the efficiency of a dictionary while allowing for efficient deduplication.

Figure 2A:
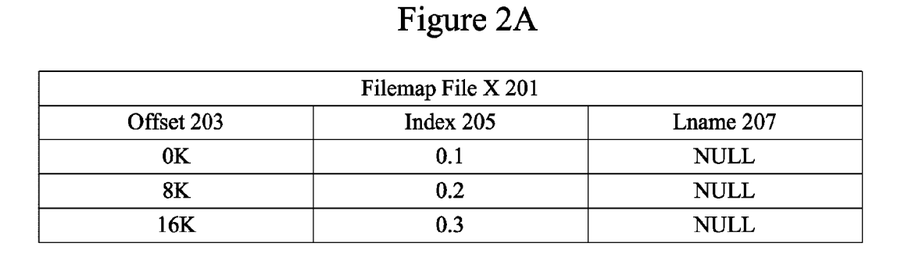
FIG. 2A illustrates a particular example of a filemap.
Figure 2B:
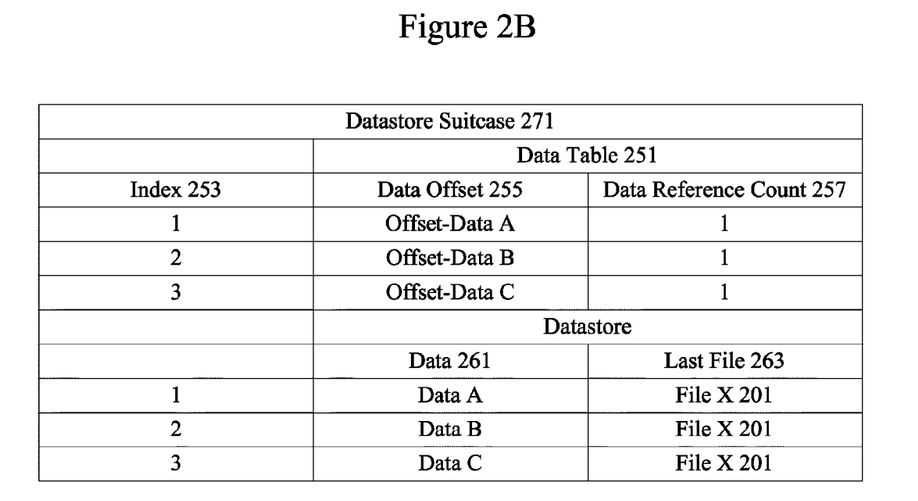
FIG. 2B illustrates a particular example of a datastore suitcase.

FIG. 2A illustrates one example of a filemap and FIG. 2B illustrates a corresponding datastore suitcase created after optimizing a file X. Filemap file X 201 includes offset 203, index 205, and lname 207 fields. According to various embodiments, each segment in the filemap for file X is 8K in size. In particular embodiments, each data segment has an index of format <Datastore Suitcase ID>. <Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 207 is NULL in the filemap because each segment has not previously been referenced by any file.

FIG. 2B illustrates one example of a datastore suitcase corresponding to the filemap file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 271 includes three offset, reference count pairs which map to the data segments of the filemap file X 201. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 201 which was last to place a reference on the data A. Index 2 includes data B and a reference to File X 201 which was last to place a reference on the data B. Index 3 includes data C and a reference to File X 201 which was last to place a reference on the data C.

The dictionary is a key for any deduplication system. It is what is used to identify duplicate data segments and point to the location of the data segment. When numerous small data segments exist in a system, the size of a dictionary can become inefficiently large. Furthermore, when multiple optimizers nodes are working on the same data set they will each create their own dictionary. This approach can lead to suboptimal deduplication since a first node may have already identified a redundant data segment but a second node is not yet aware of it because the dictionary is not shared between the two nodes. Thus, the second node stores the same data segment as an original segment. Sharing the entire dictionary would be possible with a locking mechanism and a mechanism for coalescing updates from multiple nodes. However, such mechanisms can be complicated and adversely impact performance.

Consequently, a work partitioning scheme can be applied based on hash value ranges for various data segments. Ranges of hash values are assigned to different nodes within the cluster. If a node is processing a data segment which has a hash value which maps to another node, it will contact the other node that owns the range to find out if the data segments already exist in a datastore.

Figure 3:
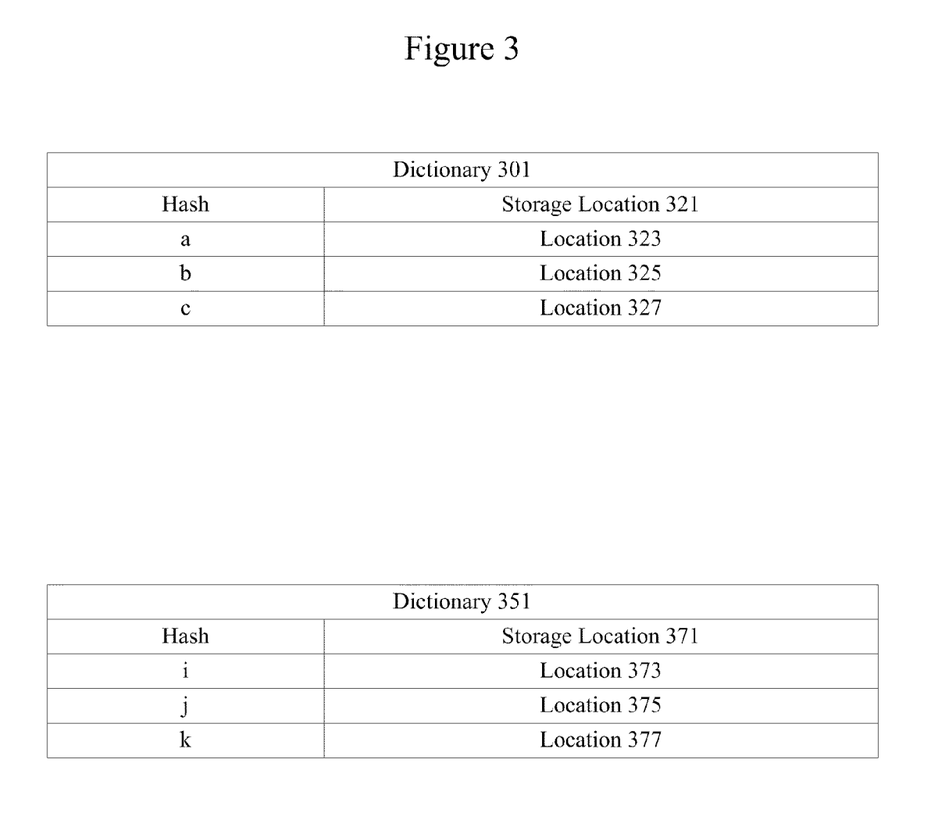
FIG. 3 illustrates a particular example of a deduplication dictionary.

FIG. 3 illustrates multiple dictionaries assigned to different hash ranges. Although hash ranges are described, it should be recognized that the dictionary index can be hash ranges, reference values, or other types of keys. According to various embodiments, the hash values are SHA1 hash values. In particular embodiments, dictionary 301 is used by a first node and includes hash ranges from 0x0000 0000 0000 0000-0x0000 0000 FFFF FFFF. Dictionary 351 is used by a second node and includes hash ranges from 0x0000 0001 0000 0000-0X0000 0001 FFFF FFFF. Values within the range for dictionary 301 are represented by symbols a, b, and c for simplicity. Values within the range for dictionary 351 are represented by symbols i, j, and k for simplicity. According to various embodiments, each hash value in dictionary 301 is mapped to a particular storage location 321 such as location 323, 325, or 327. Each hash value in dictionary 351 is mapped to a particular storage location 371 such as location 373, 375, and 377.

Having numerous small segments increases the likelihood that duplicates will be found. However, having numerous small segments decreases the efficiency of using the dictionary itself as well as the efficiency of using associated filemaps and datastore suitcases.

Figure 4A:
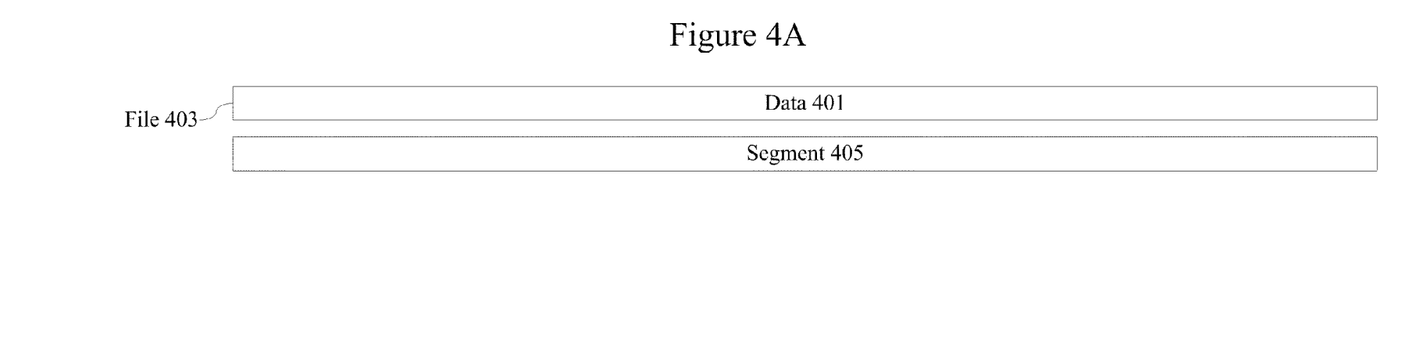
FIG. 4A illustrates a particular example of a file having a single data segment.

FIG. 4A illustrates one example of a non-container file. According to various embodiments, container files such as ZIP files, archives, productivity suite documents such as .docx, .xlsx, etc., include multiple objects of different types. Non-container files such as images and simple text files typically do not contain disparate objects.

According to various embodiments, it is recognized that certain types of non-container files do not benefit from having a segment size smaller than the size of the file itself. For example, many image files such as .jpg and .tiff files do not have many segments in common with other .jpg and .tiff files. Consequently, selecting small segments for such file types is inefficient. Consequently, the segment boundaries for an image file may be the boundaries for the file itself. For example, noncontainer data 401 includes file 403 of a type that does not benefit from finer grain segmentation. File types that do not benefit from finer grain segmentation include image files such as .jpg, .png, .gif, .and .bmp files. Consequently, file 403 is provided with a single segment 405. A single segment is maintained in the deduplication dictionary.

Figure 4B:
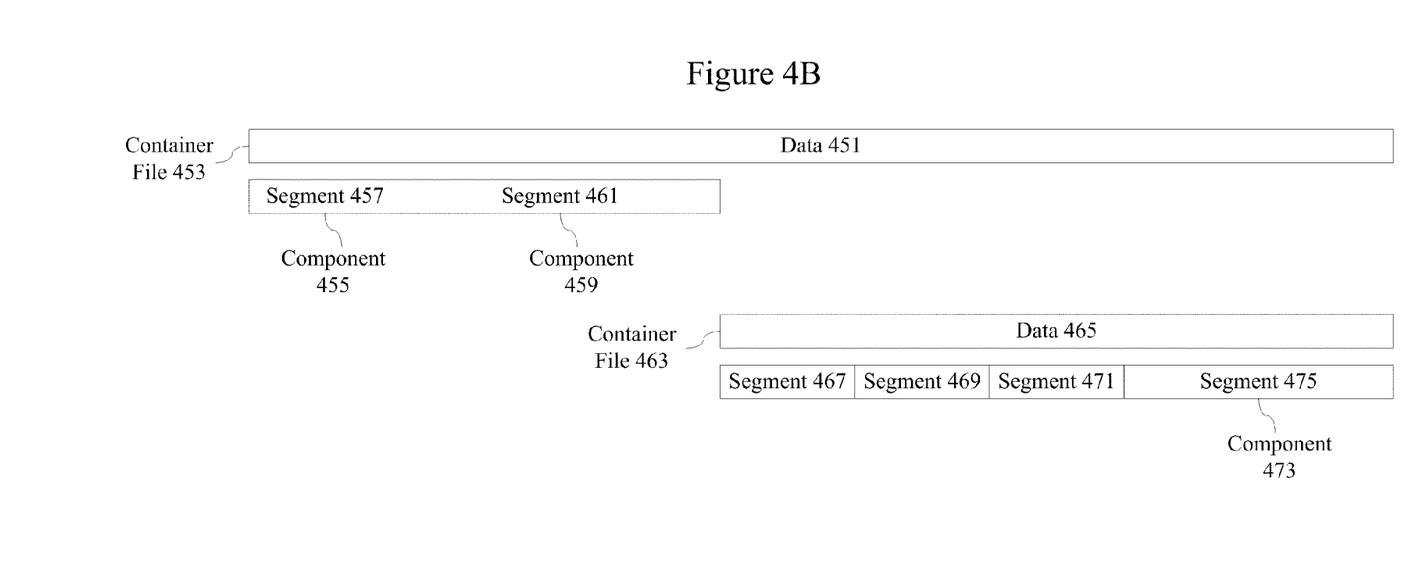
FIG. 4B illustrates a particular example of a file having multiple data segments and components.

FIG. 4B illustrates one example of a container file having multiple disparate objects. Data 451 includes a container file that does benefit from more intelligent segmentation. Instead of selecting a single segment size or using a sliding segment window, file 453 is delayered to extract file components. For example, a .docx file may include text, images, as well as other container files. For example, file 453 may include components 455, 459, and 463. Component 455 may be a component that does not benefit from finer grain segmentation and consequently includes only segment 457. Similarly, component 459 also includes a single segment 461. By contrast, component 463 is actually an embedded container file 463 that includes not only data that does benefit from additional segmentation but also includes another component 473. For example, data 465 may include text. According to various embodiments, the segment size for text may be a predetermined size or a dynamic or tunable size. In particular embodiments, text is separated into equal sized segments 467, 469, and 471. Consequently, data may also include a non-text object 473 that is provided with segment boundaries aligned with the object boundaries 475.

Figure 5:
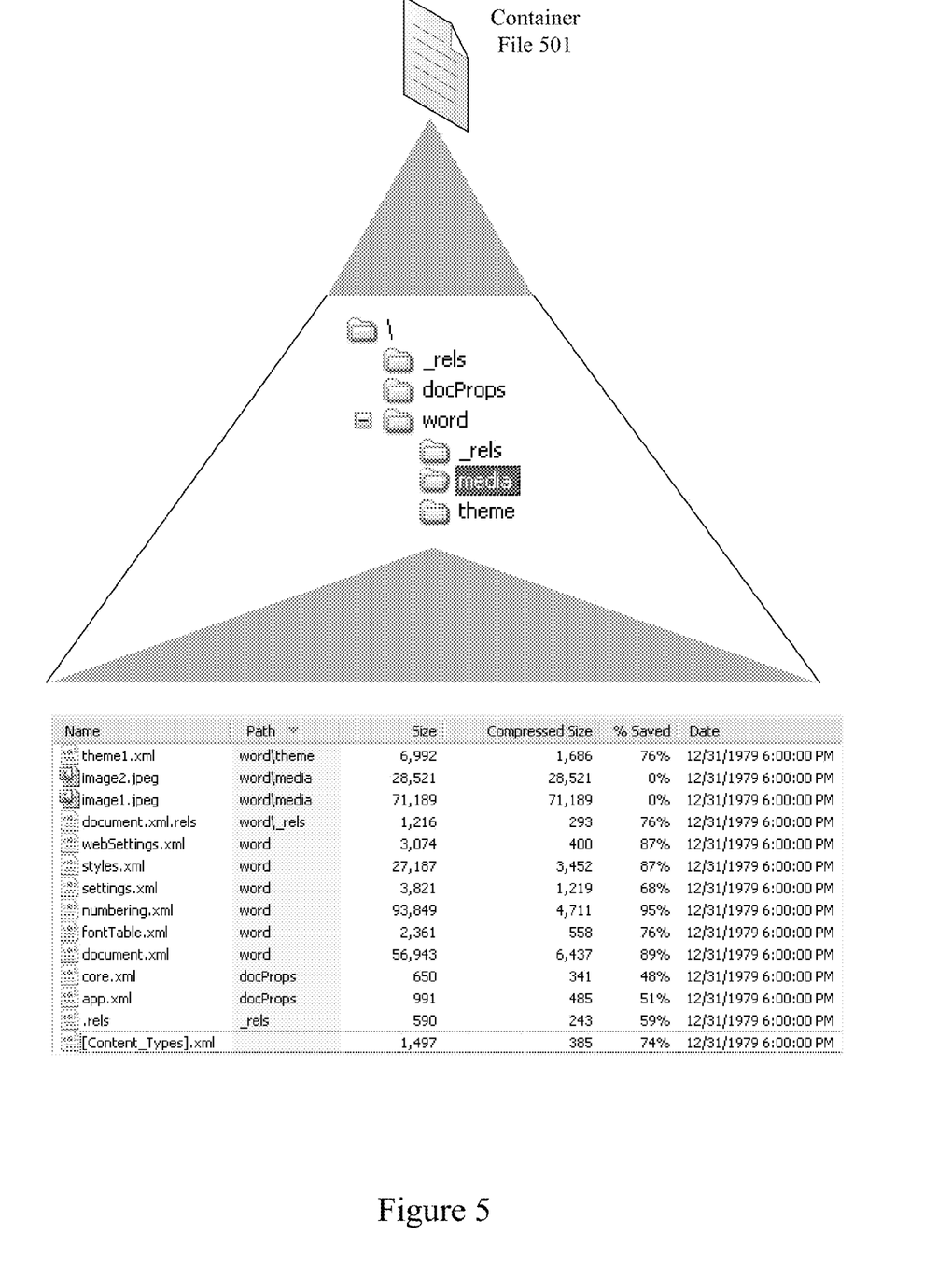
FIG. 5 illustrates a particular example of a container file.

FIG. 5 illustrates one example of a container file. According to various embodiments, container file 501 includes multiple disparate objects including .jpeg and .xml objects. The .xml objects can benefit from intelligent segmentation while the .jpeg objects are left without further segmentation.

Figure 6:
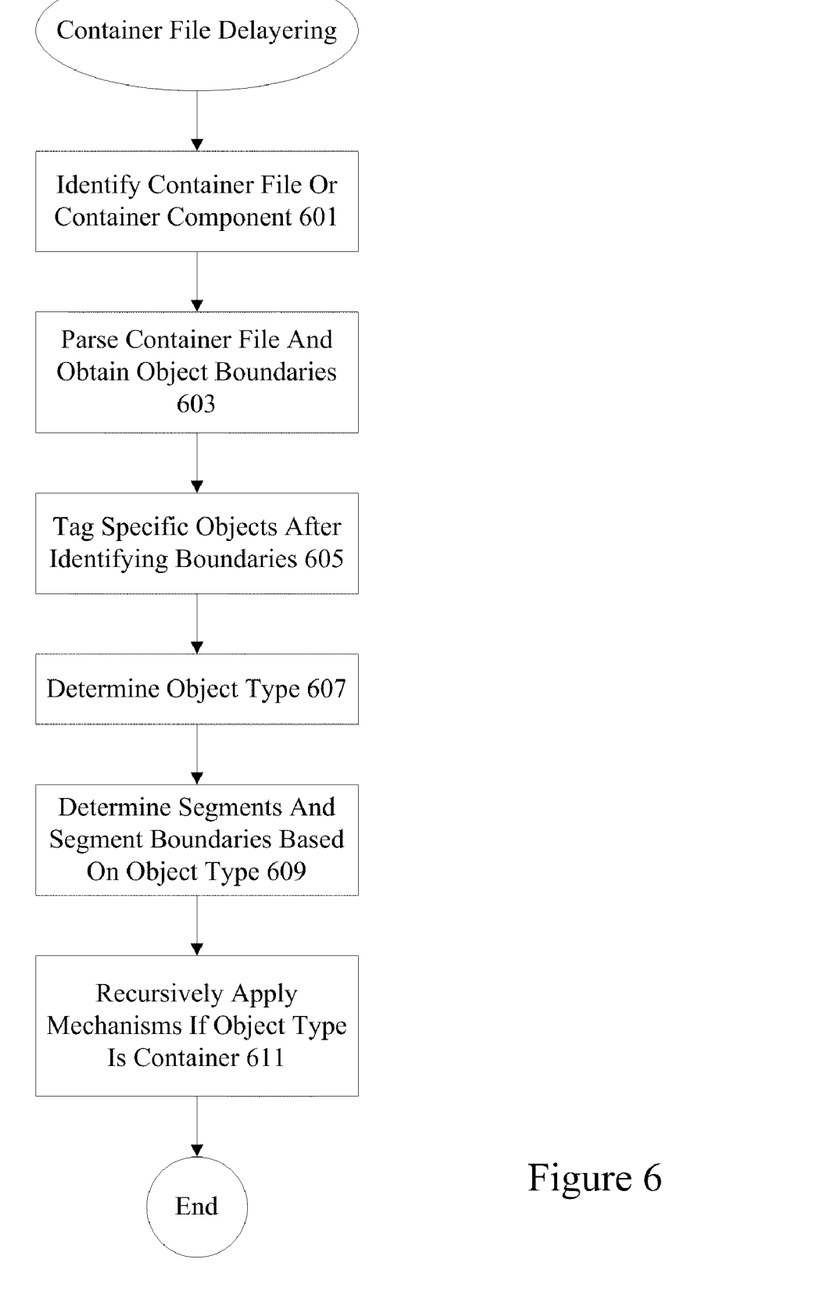
FIG. 6 illustrates a technique for delayering a container file.

FIG. 6 illustrates a mechanism for performing file delayering. According to various embodiments, the main mechanisms used for delayering are object extraction, object identification and object referencing. At 601, a container file or container component is identified. At 603, the container file is decoded and object boundaries are identified. In some example, the container file itself may have to be decompressed before identifying embedded components. When the specific boundaries are identified, the specific objects are uniquely tagged at 605. For example, a container document may include text, a spreadsheet and two images. Although this document is represented on disk as a single file, it is in actuality a container file which includes multiple documents in a specific directory hierarchy. Each file object may be individually compressed. At 607, object types are determined. At 609, segments are detected based on object or component type. For example, image type objects have segment boundaries equal to the boundaries of the image object. Text type objects may have predetermined segment sizes for that particular type of text. In some embodiments, different file types are preevaluated to determined optimal segment sizes for file types that do benefit from finer grain segmentation. At 611, mechanisms are repeated to recursively apply segment detection to objects within objects.

Once all objects in the container file have been finger printed, de-duplication at the object level can readily take place and individual objects can be stored with the redundant data being stored only once.

Figure 7:
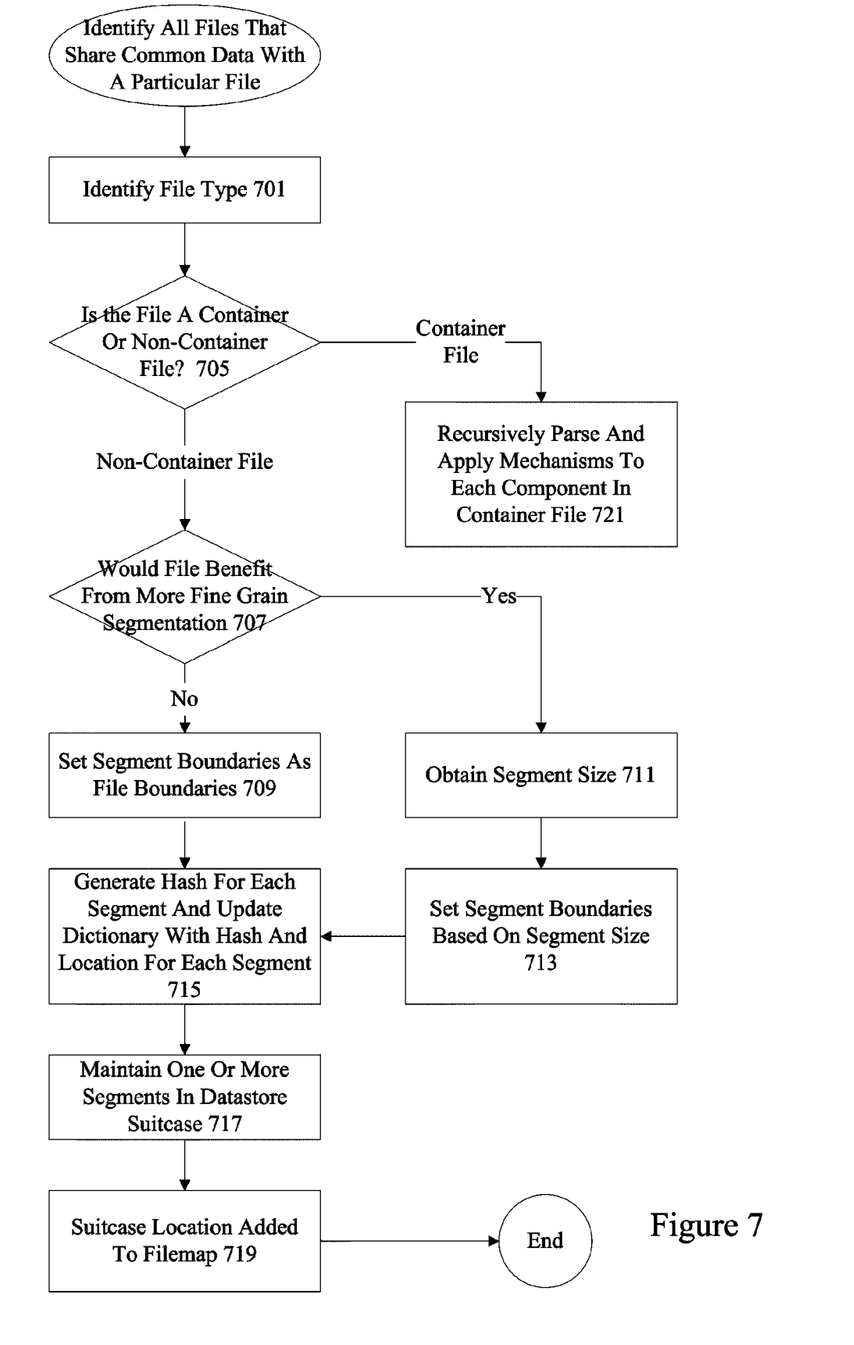
FIG. 7 illustrates a technique for detecting segment boundaries.

FIG. 7 illustrates a technique for detecting segment boundaries. At 701, file type is identified. In particular embodiments, file type may be identified by tags, extensions, embedded identifiers, etc. According to various embodiments, files may be container files or non-container files. Non-container files may or may not benefit from more fine grained segmentation. In particular embodiments, it is determined whether the file is a container file or a non-container file at 705. If the file is a non-container file, then it is determined whether the file would benefit from more fine grained segmentation at 707. If the file is of a type that does not benefit from additional segmentation, the segment boundaries are set as the file boundaries at 709. According to various embodiments, if the file is of a type that does benefit from additional segmentation, segment sizes are determined based on file type, a predetermined value or a dynamically tunable value.

According to various embodiments, various file types such as .txt, .raw, etc., are analyzed to determine preferred segment sizes and the predetermined segment sizes. In particular embodiments, a segment size is determined at 711 based on file type, a predetermined value or a dynamically tunable value. At 713, segment boundaries are set based on the obtained segment size. At 715, a hash is generated for each segment and a dictionary is updated. According to various embodiments, an entry may be added to a dictionary. In other embodiments, a reference count for a corresponding entry in the dictionary may be updated. At 717, the one or more segments are maintained in a datastore suitcase. At 719, the suitcase location is added to a filemap for the file using the segment boundaries. In situations where a file includes a single segment, the filemap may include only a single entry.

If the file is determined to be a container file at 705, the file is recursively parsed at 721 and segment detection mechanisms are applied to each individual component of the container file.

According to various embodiments, it is recognized that various file types have optimal data segment boundaries equal to the file boundaries. Recognizing this allows the storage of only one entry in the dictionary for the entire file. Images are examples of file types where the optimal data segment size is the whole file. Individual images on a disk are easy to find. However, images and other objects where the ideal deduplication boundary is the whole file can be stored in container files as well. Container files can be ZIP files or even Microsoft Office documents such as Word or Power Point documents. Delayering is used to extract objects from container files. The objects are stored and de-duplicated as individual objects.

Figure 8:
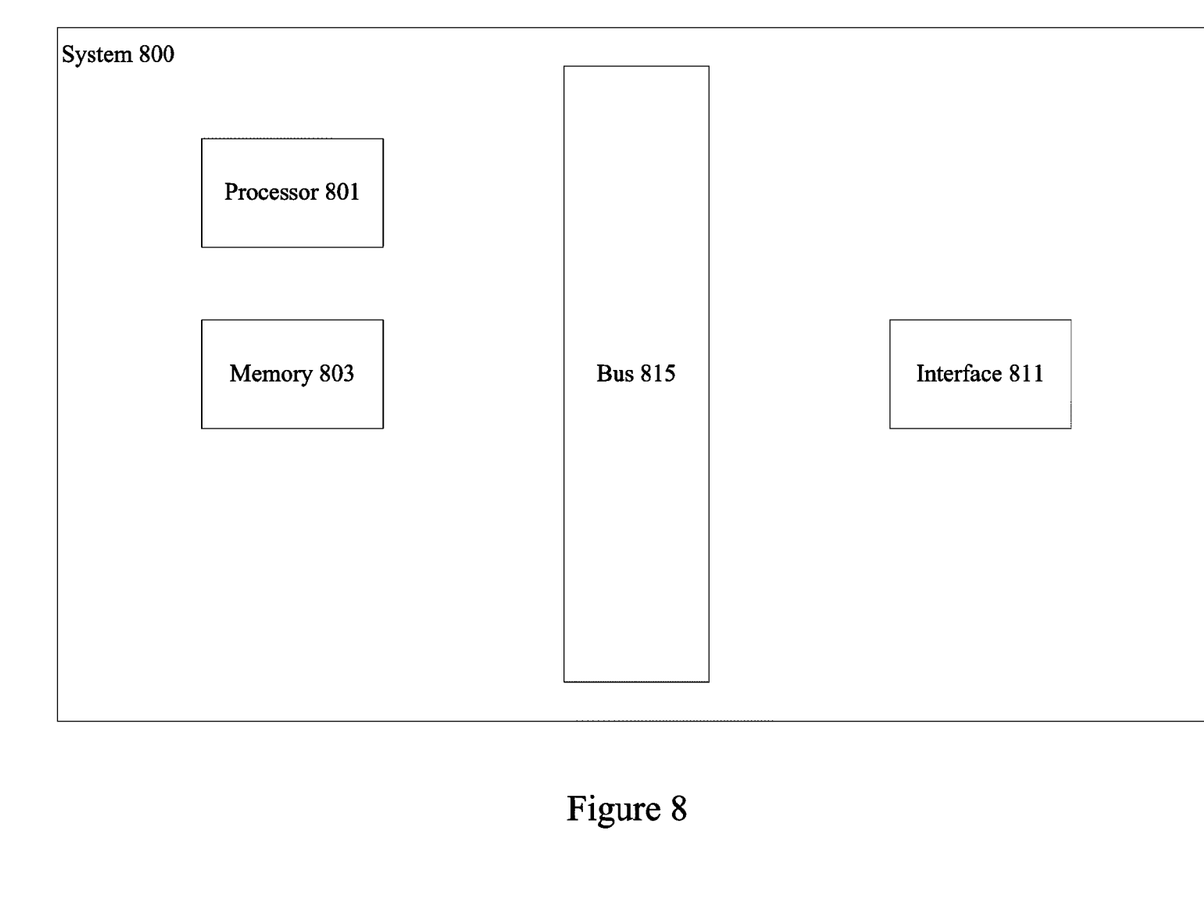
FIG. 8 illustrates a particular example of a computer system.

A variety of devices and applications can implement particular examples of commonality determination. FIG. 8 illustrates one example of a computer system. According to particular example embodiments, a system 800 suitable for implementing particular embodiments of the present invention includes a processor 801, a memory 803, an interface 811, and a bus 815 (e.g., a PCI bus). When acting under the control of appropriate software or firmware, the processor 801 is responsible for such tasks such as optimization. Various specially configured devices can also be used in place of a processor 801 or in addition to processor 801. The complete implementation can also be done in custom hardware. The interface 811 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   determining file types associated with a plurality of files received for deduplication;
   determining whether the plurality of files are container or non-container files based on the file types associated with the files;
   evaluating non-container files to identify whether the non-container files would benefit from more fine-grained segmentation, wherein non-container files that would not benefit from more fine-grained segmentation have segment boundaries set to the file boundaries, wherein container files are delayered to extract a plurality of objects, wherein segment boundaries are set at object boundaries within the container files, wherein the segment boundaries are used to identify duplicates.

2. The method of claim 1, further comprising recursively parsing container files to determine whether components of the container files are container or non-container components.

3. The method of claim 1, wherein non-container files that would benefit from more fine-grained segmentation have segment sizes obtained based on file types, a predetermined value or a dynamically tunable value.

4. The method of claim 1, wherein container files include a plurality of container and non-container components.

5. The method of claim 1, wherein container files include a plurality of components that would benefit from more fine-grained segmentation.

6. The method of claim 1, wherein container files include a plurality of components that would not benefit from more fine-grained segmentation.

7. The method of claim 1, further comprising deduplicating the plurality of files.

8. The method of claim 7, wherein deduplicating the plurality of files comprises generating a plurality of filemaps corresponding to the plurality of files.

9. The method of claim 7, wherein deduplicating the plurality of files comprises generating a plurality of datastore suitcases.

10. The method of claim 9, wherein the datastore suitcase further comprises a plurality of reference counts corresponding to a plurality of deduplicated data segments.

11. A system, comprising:
    memory configured to hold a mapping associating file types with a plurality of segment sizes;
    an interface configured to receive a plurality of files for deduplication;
    a processor configured to determine whether the plurality of files are container or non-container files based on the file types associated with the file and determine whether the non-container files would benefit from more fine-grained segmentation, wherein non-container files that would not benefit from more fine-grained segmentation have segment boundaries set to the file boundaries, wherein container files are delayered to extract a plurality of objects, wherein segment boundaries are set at object boundaries within the container files, wherein the segment boundaries are used to identify duplicates.

12. The system of claim 11, wherein container files are recursively parsed to determine whether components of the container files are container or non-container components.

13. The system of claim 11, wherein non-container files that would benefit from more fine-grained segmentation have segment sizes obtained based on file types, a predetermined value or a dynamically tunable value.

14. The system of claim 11, wherein container files include a plurality of container and non-container components.

15. The system of claim 11, wherein container files include a plurality of components that would benefit from more fine-grained segmentation.

16. The system of claim 11, wherein container files include a plurality of components that would not benefit from more fine-grained segmentation.

17. The system of claim 11, further comprising deduplicating the plurality of files.

18. The system of claim 17, wherein deduplicating the plurality of files comprises generating a plurality of filemaps corresponding to the plurality of files.

19. The system of claim 17, wherein deduplicating the plurality of files comprises generating a plurality of datastore suitcases.

20. A computer readable medium having computer code embodied therein, the computer readable medium comprising:
computer code for determining file types associated with a plurality of files received for deduplication;
computer code for determining whether the plurality of files are container or non-container files based on the file types associated with the files;
computer code for evaluating non-container files to identify whether the non-container files would benefit from more fine-grained segmentation, wherein non-container files that would not benefit from more fine-grained segmentation have segment boundaries set to the file boundaries, wherein container files are delayered to extract a plurality of objects, wherein segment boundaries are set at object boundaries within the container files, wherein the segment boundaries are used to identify duplicates.

* * * * *